(12) United States Patent
Cooper

(10) Patent No.: US 8,613,781 B2
(45) Date of Patent: Dec. 24, 2013

(54) LIGNIN DEWATERING PROCESS

(76) Inventor: Harrison R. Cooper, Bountiful, UT (US)

( * ) Notice: Subject to any disclaimer, the term of this patent is extended or adjusted under 35 U.S.C. 154(b) by 777 days.

(21) Appl. No.: 12/189,046

(22) Filed: Aug. 8, 2008

(65) Prior Publication Data

US 2009/0038212 A1    Feb. 12, 2009

Related U.S. Application Data

(60) Provisional application No. 60/964,106, filed on Aug. 8, 2007.

(51) Int. Cl.
*C10L 5/00* (2006.01)
*D21C 11/00* (2006.01)

(52) U.S. Cl.
USPC .............................. 44/550; 162/16

(58) Field of Classification Search
USPC .................. 162/16, 17, 29; 44/550
See application file for complete search history.

(56) References Cited

U.S. PATENT DOCUMENTS

| | | | |
|---|---|---|---|
| 2,988,470 A * | 6/1961 | Bradway et al. ................. 162/17 |
| 3,546,200 A | 12/1970 | Whalem et al. |
| 3,935,121 A | 1/1976 | Lieberman et al. |
| 4,107,073 A | 8/1978 | Maciaszek |
| 4,230,599 A | 10/1980 | Elfers |
| 4,455,257 A | 6/1984 | Hoftiezer et al. |
| 4,561,934 A | 12/1985 | Rimpi |
| 4,584,057 A | 4/1986 | Rowe et al. |
| 4,724,045 A | 2/1988 | Ackel |
| 4,921,613 A | 5/1990 | Nordberg |
| 4,950,420 A | 8/1990 | Svarz |
| 5,034,094 A | 7/1991 | Kurple |
| 5,262,963 A | 11/1993 | Stana et al. |
| 5,470,433 A | 11/1995 | Brodersen et al. |
| 5,632,857 A | 5/1997 | Larson |
| 5,635,024 A | 6/1997 | Shall |
| 5,824,132 A | 10/1998 | Kopyleva et al. |
| 5,865,898 A | 2/1999 | Holtzapple et al. |
| 6,039,189 A | 3/2000 | Luke |
| 6,096,215 A | 8/2000 | Fang |
| 6,632,327 B1 * | 10/2003 | Shall ................................ 162/29 |
| 6,830,696 B1 | 12/2004 | El-Shall et al. |
| 6,855,180 B1 | 2/2005 | Pinatti et al. |
| 7,396,434 B2 * | 7/2008 | Rodriguez Rivera et al. .. 162/16 |

FOREIGN PATENT DOCUMENTS

CN    1060128 A    4/1992

* cited by examiner

*Primary Examiner* — James Goloboy
*Assistant Examiner* — Chantel Graham
(74) *Attorney, Agent, or Firm* — Thorpe North & Western LLP

(57) ABSTRACT

A lignin plastics solids mass containing lignin solids and liquids with up to 85% liquids can be partially dewatered by heating the lignin plastics solids mass to above a critical temperature at which time the lignin plastics solids agglomerate into lower moisture granular solids with between about 45% to 55% liquids releasing excess liquid which can be easily removed from the solids. The process is particularly useful for lignin plastics solids removed from black liquor from paper mills, or for similar lignin plastics solids masses, which can contain up to 85% liquids and which need to be dried to form useful lignin solids, which can be used for example for fuel. The dewatering process can be combined with the process for separating the lignin from the black liquor to separate the dewatered lignin directly from the black liquor.

7 Claims, 3 Drawing Sheets

SCHEMATIC DESCRIPTION OF LIGNIN PREPARATION PROCESS

LIGNIN DEWATERING PROCESS

RELATED APPLICATIONS

Figure 1:
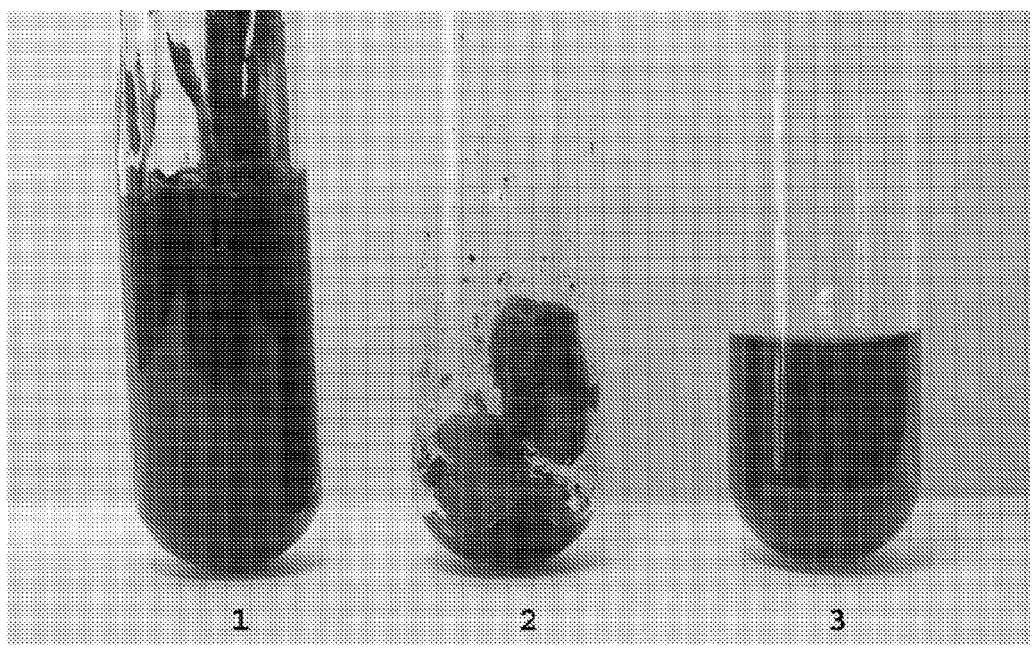

This application claims the benefit of U.S. Provisional Patent Application No. 60/964,106, filed on Aug. 8, 2007, which is incorporated by reference herein in its entirety.

BACKGROUND OF THE INVENTION

1. Field

The invention relates to reduction of water content in ligneous materials with high moisture content, particularly ligneous materials such as lignin solids separated from paper industry spent pulping liquor, such as spent waste alkaline digestion liquor known as "black liquor."

2. State of the Art

U.S. Pat. Nos. 5,635,024 and 6,632,327, hereby incorporated by reference, describe a process for recovering lignin solids from spent, waste alkaline digestion liquors from the paper industry. These liquors are generally referred to as "black liquors." The recovery of lignin solids is accomplished by mixing into spent digestion liquor a water soluble, surface active, polymeric, coagulant agent, and then acidifying the mixed liquor to a pH below 7 to separate the lignin and other organic compounds, and to coagulate them as solids which tend to float to the surface of the residual liquid. The coagulated solids, which generally form a lignin plastics solids mass are then separated from the residual liquid. These separated solids may contain up to about 85 percent liquid, mostly water. To make beneficial use of these solids, such as by combustion of the lignin solids as fuel for generating electric power and steam, it is generally desired to reduce the water content of these solids. To use these lignin solids as fuel for generating electric power and steam, the water content should be brought down to no more than about 30 percent water, and preferably to the range of less than about 5 percent water to gain the best possible thermal efficiencies.

The separated lignin solids can be dried to reduce the moisture content in commercial thermal treatment or drying equipment. However, this equipment uses substantial amounts of energy to dry the lignin solids, and therefore reduces the overall thermal fuel efficiency. To reduce energy consumed in drying, non-thermal means of reducing lignin solids moisture have been investigated such as mechanical separation of water from the lignin by pressure. It has been shown that lignin moisture content can be reduced to about 65 percent by compression in a pressure cell device, and subsequently dried by thermal methods using a commercial system to further reduce the moisture. However, this process still requires substantial drying energy. Even with the initial mechanical drying, however, the additional required drying by thermal methods involves high energy consumption to an extent almost equivalent to the energy values derived from combustion of the dried lignin. The significant energy needs in applying these past known techniques have discouraged their acceptance.

In another application, high moisture content sewage sludge collected from biological treatment, which sludge, in many respects, has properties similar to the lignin solids from black liquor, has been partially dewatered for combustion by filtration by the electrode watering technique. Again, however, the significant energy needs in reducing the water content of the sludge have discouraged use of sludge as an energy source. A simple and low energy cost method for processing lignin solids and similar materials such as sludge for water reduction is not known.

SUMMARY OF THE INVENTION

The inventor has discovered that lignin solids having high moisture content (up to about 85 percent water content) separated from black liquor by the El-Shall process of U.S. Pat. Nos. 5,635,024 and 6,632,327, can be induced to agglomerate into lower moisture granular lignin solids, having a moisture content typically in range of about 45 to about 55 percent moisture, by heating the separated lignin mass to above about 180° F. At a temperature in a range around about 180° F., hereinafter referred to as the critical temperature, the lignin phase undergoes transition. This critical temperature can vary according to the characteristics and the source of lignin, such as whether extracted from wood or agricultural residues, and whether the lignin previously had been subjected to digestion in a biological treatment facility. The lignin used can be from any source, including one or more of paper or other processing facilities, discarded or waste biomass, wood, agriculture, etc. When the lignin mass being heated during the treatment process reaches the critical temperature for separation, lignin solids precipitate as the mass is subsequently cooled, while released water accumulates as a supernatant.

The density difference between the water and the newly-formed solids allows gravity to cause the lignin solids to settle below the aqueous phase. The principle part of the water released from the lignin mass is readily decanted from the precipitated lignin solids after conducting the described thermal treatment. The released water can be taken away and recycled for biological treatment as in the usual application of black liquor treatment. Thus, for example, a quantity of lignin plastic mass of 1000 grams weight, typically containing 850 grams of water and 150 grams of dry lignin solids, is caused by the inventive process to divide into a granular solids phase of approximately 300 grams of moisture infused solids—150 grams of water and 150 grams of dry solids—and a quantity of aqueous phase comprising about 700 grams. The treatment results in about 80 percent of water contained in the lignin plastic mass becoming supernatant for recycling, with only about 20 percent of water remaining with the lignin solids. Optionally, the residual water in the lignin solids can be reduced or eliminated further by means of thermal drying using commercially available equipment. Such additional drying can be in anticipation of, for example, using the lignin solids as a combustible fuel source to generate, e.g., power and steam.

Other non-limiting examples of materials that may be likewise treated include forestry debris and/or waste, forestry products including wood, and any other source of lignin.

The dewatering process of this invention can be combined with the El-Shall black liquor-lignin separating process of the cited patents to provide a separated and dewatered lignin product from the black liquor in substantially a single step. This can be done by providing two process streams. One process stream can be dilute black liquor from the paper mill mixed with polymer solution, which emerges from digestion/fiber separation at temperatures in range of about 200° F. to about 300° F. The other process stream can be heated acidified dilution (clarified) liquor. If the two streams are at room temperature when combined in the process, lignin separates as a high water content plastic mass that then can be optionally dewatered by heating as previously disclosed. However, when the two heated liquid streams are mixed, lignin solids precipitate as the mixture cools. The lignin solids require a finite reaction time for their transformation to the dewatered (consolidated) state. This can be implemented by discharging the combined flow—after mixing—into a conical bottomed tank wherein the lignin begins precipitation as the mixture cools. It should be noted that tanks or other storage containers can be utilized at this step in the process, although conical bottomed tanks are exemplified herein. By discharging the combined flow into a tank, the necessary time is provided for cooling and completing the lignin solids consolidation process and to separate the dewatered solids by gravity into the bottom of the tank. Dewatered lignin solids can be removed from the process by a physical separation means. A non-limiting example includes a screw conveyor or a similar suitable material handling device positioned to receive the solids flowing from the bottom of the tank.

THE DRAWINGS

Figure 2:
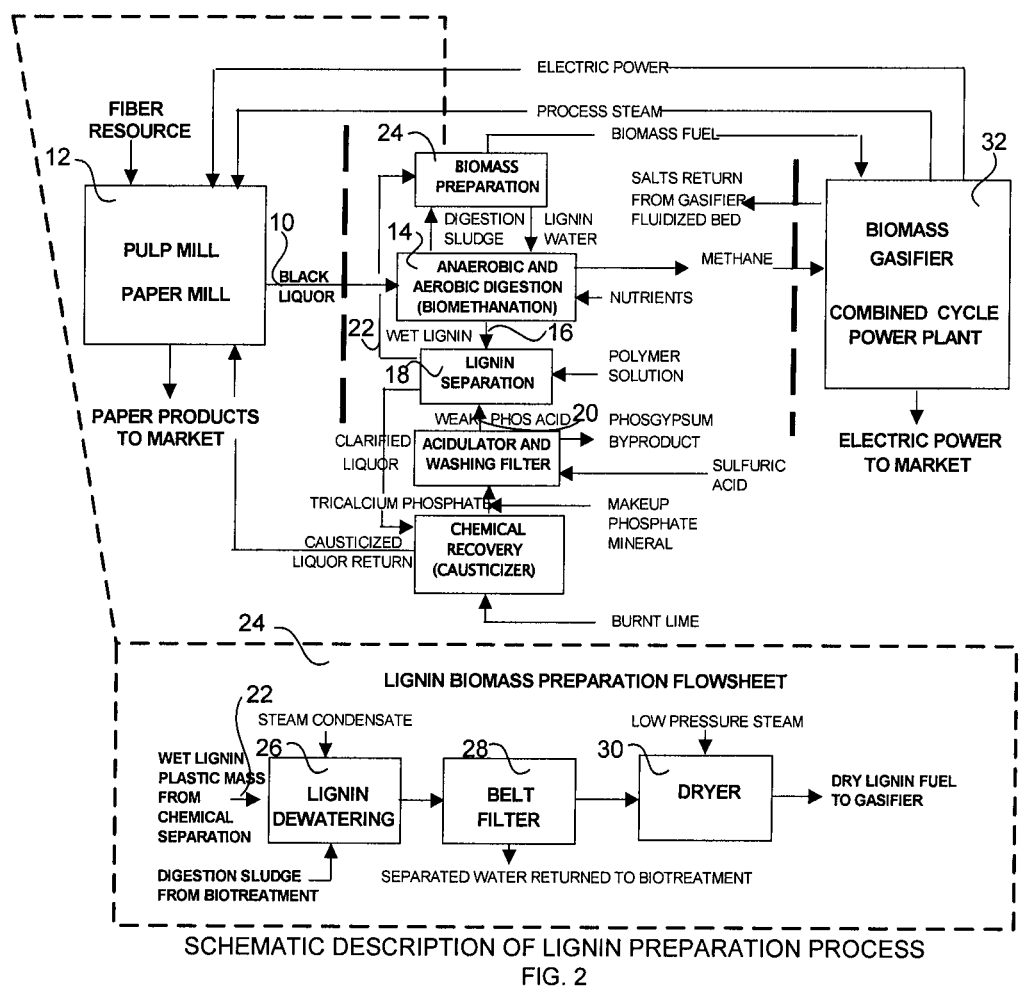
Figure 3:
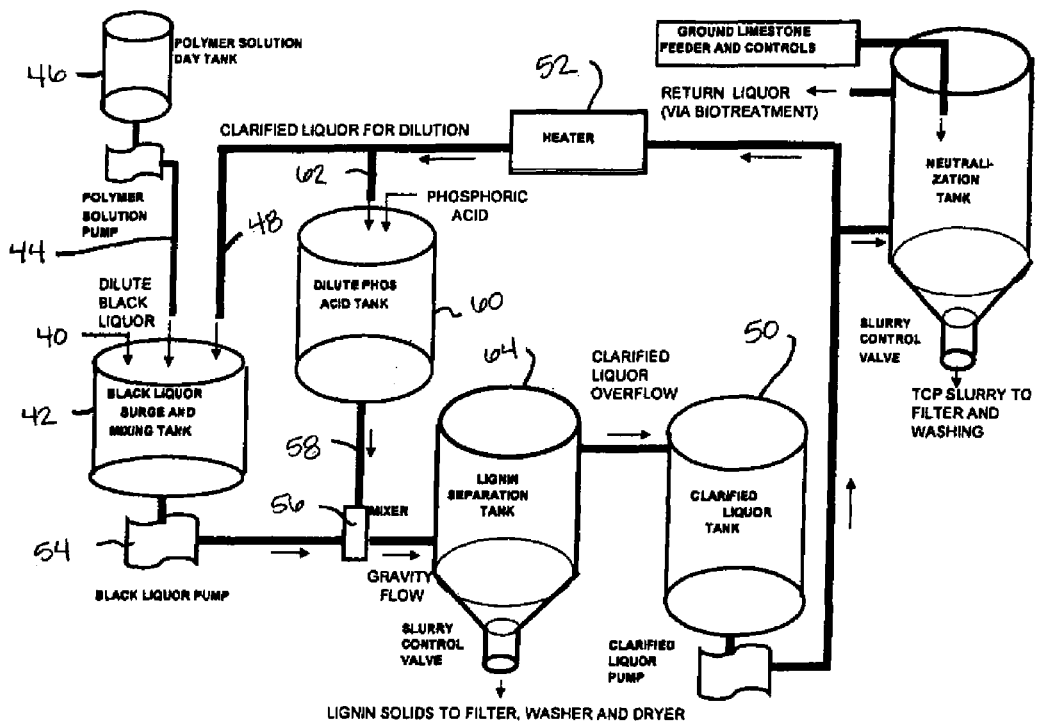

In the accompanying drawings, which show the best mode currently contemplated for carrying out the invention:

FIG. 1 shows three test tubes with test tube 1 containing a sample of unprocessed high moisture lignin plastic mass from a black liquor separation process, test tube 2 containing granulated wet solids remaining after treatment, and test tube 3 containing the supernatant aqueous phase decanted after treatment;

FIG. 2 is a schematic flow diagram in block form of a black liquor treatment process incorporating the dewatering process; and FIG. 3 is a schematic flow diagram of a second embodiment of a black liquor treatment process incorporating the dewatering process.

DETAILED DESCRIPTION OF THE ILLUSTRATED EMBODIMENT

A method is presented herein wherein lignin plastic solids are at least partially dewatered in an energy effective manner. As such, the lignin plastic solids can be utilized as an effective fuel source. In one aspect, the method includes heating lignin plastic solids to a temperature above a critical temperature and subsequently reducing the temperature, thus causing the lignin plastic solids to agglomerate into lower moisture granular solids having a moisture content of less than about 60% and decanting at least a portion of the residual liquid to separate the lower moisture solids from the residual liquid. In one aspect, the lower moisture granular solids can have a moisture content of less than about 50%, and in another aspect, the lower moisture granular solids can have a moisture content of from about 45% to about 55%. The critical temperature, as discussed further below, can, in one aspect be greater than about 170° F., or even greater than about 180° F. In a specific embodiment, the critical temperature can range from about 170° F. to about 200° F.

Similarly, a process for treating a substantially spent, alkaline and non-sulphite digestion liquor obtained from a pulping plant of the paper making industry, the digestion liquor containing lignin as a potential precipitant upon acidification of the digestion liquor and leaving substantially clarified residual liquid can include mixing into the spent digestion liquor a water soluble, surface active, polymeric coagulant agent. The process can further include acidifying the so mixed liquor to a pH below about 7 to precipitate the lignin and other organic compounds and to coagulate them as solids which tend to float to the surface of the residual liquid. In one specific embodiment, the so mixed liquor is acidified to a pH below about 3.5 and in another embodiment to below about 3.

Further, the process can include heating the digestion liquor to a temperature above a critical temperature to cause the lignin to precipitate as lower moisture granular solids, and separating the precipitated lower moisture granular solids from the residual liquid.

In one aspect, the surface active agent coactive with the polymeric coagulant agent is added to the spent digestion liquor prior to the acidification thereof so as to coact with the polymeric coagulant agent and thereby facilitate lignin separation. In another aspect, the surface active agent is a water soluble surface active co-precipitant agent. The digestion liquor can be from a variety of sources. In one embodiment, the spent digestion liquor can be taken from a kraft process pulping plant. In a further embodiment, the kraft process pulping plant can include a reducing recovery furnace and the spent digestion liquor taken from the plant is substantially only that produced in excess of what the furnace is capable of handling. Alternatively, the spent digestion liquor can be taken from a soda process pulping plant. In a further embodiment, the spent digestion liquor can be taken from digestion of any cellulosic biomass, such as agro waste or residue.

In one aspect, the coagulant agent is added to the spent digestion liquor before acidification of the liquor. In another aspect, the coagulant agent is added to the spent digestion liquor during acidification of the liquor. In still another embodiment, the spent digestion liquor is diluted prior to treatment. The solids and the residual liquors can be used as valuable products, in some aspects.

In a specific aspect, a process for treating a spent kraft alkaline digestion liquor containing lignin and liquid can include mixing into the spent kraft digestion liquor a water soluble, surface active, polymeric coagulant agent; acidifying the spent digestion liquor to a pH below about 3 to cause lignin and other dissolved organic compounds of the spent digestion liquor to coagulate as solids and float to the surface of the spent digestion liquor; heating the digestion liquor and solids to a temperature of greater than about 180° F. to form lower moisture granular solids; and separating the lower moisture granular solids and the residual liquid of the acidified spent digestion liquor.

In one aspect, the invention is a method for at least partially dewatering a lignin plastic solids mass containing lignin solids and a liquid, by heating the lignin plastics solids mass to a critical temperature, which causes the lignin plastics solids to agglomerate into lower moisture content granular solids and releasing excess moisture in the form of a liquid that can be decanted from the granular solids. This aspect of the invention can be advantageously applied to a lignin plastics solids mass containing lignin solids and a liquid, such as a portion of the black liquor which remains in the lignin plastics solids mass when it is separated from the black liquor by the El-Shall method disclosed in cited U.S. Pat. Nos. 5,635,024 and 6,632,327. The lignin plastics solids mass can contain up to about 85 percent liquids, which are mostly water. The lignin plastic solids mass is heated to a temperature above a critical temperature of greater than about 180° F. It should be noted that the term, "critical temperature," as used herein, is in relation to the specific method disclosed herein, and is not necessarily associated with the "critical temperature" of classic chemistry. Herein, the term refers to the lowest temperature at which lignin plastics solids mass converts to a supernatant liquid and granular solids following elevation to the temperature followed by cooling. Additionally it is believed the critical temperature is that at which the lignin component of the mass or mixture melts. At that temperature, the lignin plastics solids mass resulting from the cited El-Shall method separates, where the lignin plastic solids agglomerate into lower moisture granular solids having a moisture content of less than about 60%, releasing the excess liquor, mostly water, or other liquid. At least a portion of the residual excess liquor or other liquid can be decanted to provide a lower moisture lignin solid. It should be noted that the term, "high moisture content" as used herein can vary due to the type of stream or materials, however, the term can generally refer to a moisture content of greater than about 85 percent water and/or other liquid content. Thus, lignin plastic solids of high moisture content produced from black liquor by the El-Shall process can be induced to agglomerate the lignin plastics solids into lower moisture granular solids by heating the plastic mass to above 180° F. Also, as used herein, the "lower moisture granular solids" refer to granular solids having a lower moisture content than the lignin plastic solids or other process stream or material from which they are produced. The distinction between the granular solids and the lignin plastic solids or other process stream should be significant enough to at least partially produce a visibly apparent physical separation. In one aspect, the lower moisture granular solids can have a moisture content of from about 45 percent to about 55 percent moisture. At the critical temperature, the lignin phase state undergoes transition. The transition temperature can vary according to characteristics and the source of the lignin (such as whether extracted from wood or agricultural residues, and whether lignin previously had been subjected to digestion in a biological treatment facility). When the lignin mass being heated during the treatment process reaches the critical temperature for separation, which is believed to be a temperature which liquidfies the lignin, lignin solids precipitate upon subsequent cooling, while released water or other liquid remains as a supernatant. The supernatant can be an optically clean liquid, however, it typically is colored by dissolved matter.

Lignin granular solids settle by gravity to below the aqueous phase due to the density differences between the granular solids and the water. The settling of the solids produces at least a partial separation of granular solids below a liquid supernatant. The supernatant, which is typically primarily composed of water, can then be readily decanted. Other forms of physical separation are also possible to separate the supernatant from the granular solids. In one aspect, the released water, or supernatant can be recycled for biological treatment in the usual application of black liquor treatment as embodied in the processes employing this invention.

Thus, for example, a quantity of lignin plastic mass of 1000 grams weight typically containing 850 grams of water and 150 grams of dry lignin solids is caused by the disclosed process to divide into a granular solids phase of approximately 300 grams of moisture infused solids—150 grams of water and 150 grams of dry solids—and a quantity of aqueous phase comprising about 700 grams. The treatment results in about 80 percent of water contained in the lignin plastic mass becoming supernatant for recycling with only about 20 percent of water remaining with the lignin solids.

In one aspect, at least some of the residual water in the granular solids can be eliminated by further means such as by thermal drying using commercially available equipment in preparing lignin solids for fuel to generate power and steam. Optionally, ambient drying can be used. Preferably the drying temperature is below the critical temperature, and preferably below about 170° F.

FIG. 1 illustrates the results of the process described above by showing test tubes with samples of lignin before and after treatment for eliminating the bulk of contained water from the original high moisture plastic mass. In FIG. 1, test tube 1 contains a sample of unprocessed high moisture lignin plastic mass from the black liquor separation. Test tube 2 contains granulated wet solids remaining after treatment, and test tube 3 contains the supernatant aqueous phase decanted after treatment from the treated lignin mass. Thus, test tube 1 shows the original high moisture plastic mass before the dewatering treatment. This mass contains about 85 percent moisture. Test tube 2 shows the granulated solids which were precipitated out of the original mass in test tube 1 by heating to 180° F. Test tube 3 shows the excess moisture released from the lignin mass when the granulated solids shown in test tube 2 were formed.

Results of an example experiment are as follows: lignin plastic mass sample weight in test tube 1 is 10.2 grams. Weight of wet granulated solids precipitated by the herein disclosed process is 2.9 grams in test tube 2. Weight of supernatant aqueous phase decanted from the treatment into test tube 3 is 7.3 grams by difference.

Additional experiments have been carried out on a small scale by batch testing using beakers and microwave heating. Dilute black liquor obtained from a major paper company comprised of separate softwood kraft pulping liquor and hardwood kraft pulping liquor samples were used. Tests were also conducted using a soda chemical pulping liquor (non-kraft). All the experiments further confirmed efficacy of the process. Some of the experiments were planned toward gaining insight on how the process would be operated continuously for use in a commercial installation.

FIG. 2 shows, in block diagram, a process for lignin separation from black liquor from a paper plant followed by lignin preparation (biomass preparation) for use in a power plant. Black liquor flows on line 10 from paper mill 12 to an anaerobic and aerobic digester 14 from which the black liquor flows, arrow 16, to lignin separator 18. Polymer has been or is added to the black liquor and weak phosphoric acid is added, line 20, to the black liquor in the separator 18. This causes the separation of the lignin mass from the black liquor to produce the wet lignin plastics mass which flows from the lignin separator 18 through line 22 to the biomass preparation stage 24. Biomass preparation stage 24 is broken out separately in the lower portion of FIG. 2 to show the lignin dewatering 26, which, as described above, involves heating the wet lignin plastics mass above the critical temperature (e.g., about 180° F.) causing formation of the lignin granular solids and releasing liquid. These lower moisture content lignin granular solids are mixed with other solids and are further filtered 28 and dried 30 and then conveyed to a power plant 32. In this process, the lignin dewatering is carried out as a separate step in the process.

In one aspect, a degree of lignin consolidation (essentially, lignin separation and dewatering) can be induced by having the two contacting streams separately raised to about or above the critical temperature, e.g., about 180° F. In a specific aspect, the two process streams can be dilute black liquor from a paper mill mixed with polymer solution, which emerges from digestion/fiber separation at temperatures in range of about 200° F. to about 300° F. In a specific embodiment, the dilute black liquor emerges at or around about 200° F. The second stream can, in one aspect, comprise or consist essentially of heated acidified dilution (clarified) liquor. If the two streams are at room temperature when combined in the process, lignin separates as a high water content plastic mass which then can be dewatered by heating as previously disclosed. However, when the two liquids are mixed while heated to the elevated temperature, lignin solids precipitate to cause its dewatering upon cooling. The mixing can result from any form of mixing as known in the processing arts, including mixing induced by physical means, e.g., mixing blades, as well as process design to produce mixing by the combining of flowing process streams. Such processing can be configured as batch, continuous, or semi-continuous.

The lignin solids require a finite reaction time for their transformation to the dewatered (consolidated) state. This can be implemented by discharging the combined flow—after mixing to produce lignin precipitate—into a separating tank. The tank can be of any shape or size that allows for the desired separation. In one aspect, the separating tank is a conical bottomed tank. By introducing the combined flow into a tank, the necessary time is provided for cooling and completing the lignin solids consolidation process and separating the dewatered solids by gravity into the bottom of the tank. Dewatered lignin solids can be removed from the process by any physical separation means. In one aspect, a screw conveyor or a similar suitable material handling device positioned to receive the solids flowing from bottom of the tank can be used to separate the dewatered lignin solids.

An example process for this is illustrated in FIG. 3. The black liquor from the paper mill, which emerges from the paper mill digestion/fiber separation at temperatures in range of about 200° F. to about 300° F., and in one aspect, about 200° F., is delivered, arrow 40, to black liquor surge and mixing tank 42 where the black liquor is mixed with polymer solution, line 44, from polymer solution day tank 46, and with clarified liquor for dilution, line 48, from clarified liquor tank 50. It has been found that a volume ratio of dilute black liquor, i.e., black liquor as it is discharged directly from the digestion/fiber separation, to clarified liquor of about 1:1 works well. Mixing ranges vary depending on material used and can range from about 5:1 to about 1:5. Dilute black liquor, as used herein, is consistent with industry use and refers to the black liquor from digestion processing and prior to evaporation. The clarified liquor is heated by heater 52 to a temperature above 180° F. so that the temperature of the black liquor, with added polymer and clarified liquor, remains above 180° F. The hot mixed black liquor is pumped by pump 54 to mixer 56 where the hot black liquor with polymer therein is mixed with dilute phosphoric acid, line 58, from acid tank 60, which has been heated by heated clarified liquor added thereto, line 62. The pH of the combined streams should be acidic and, in one embodiment, is less than about pH 3.5. The volumetric ratio and/or pH of entering streams should be adjusted according. For example, one volume of dilute acid to three volumes of dilute black liquor is a useful volumetric ratio. The mixed black liquor is delivered to lignin separation tank 64, e.g., a conical bottomed tank, where separation of the lignin from the black liquor occurs upon cooling. Time in lignin separation tank 64 provides the necessary time for completing the lignin solids consolidation process and the dewatered solids separate from the liquid by gravity into the bottom of the tank. Dewatered lignin solids can be removed from the bottom of lignin separation tank 64 by a screw conveyor or a similar suitable material handling device positioned to receive the solids flowing from bottom of the tank. The dewatered lignin solids may be further processed by filtering, washing, and/or drying.

Experiments for the lignin consolidation process were carried out in batch mode by heating the two liquids (black liquor and dilute acid) and mixing them while hot for successful consolidated formation of separated and dewatered lignin solids. Dewatered lignin solids were separated from the liquor by filtration. Similar experiments of a continuous process of heating the two liquids and mixing them have likewise been successful in resulting in separated dewatered lignin solids.

Whereas the invention is here illustrated and described with reference to embodiments thereof presently contemplated as the best mode of carrying out the invention in actual practice, it is to be understood that various changes may be made in adapting the invention to different embodiments without departing from the broader inventive concepts disclosed herein and comprehended by the claims that follow.

The invention claimed is:

1. A process for treating a substantially spent, alkaline and non-sulphite digestion liquor obtained from digestion of a cellulosic biomass, said digestion liquor containing lignin as a potential precipitant upon acidification of said digestion liquor, leaving substantially clarified residual liquid, said process comprising:
    mixing into said spent digestion liquor a water soluble, surface active, polymeric, coagulant agent;
    making a heated acidified dilution liquid;
    mixing the heated acidified dilution liquid and the spent digestion liquor into which the water soluble, surface active, polymeric, coagulant agent has been mixed to produce a mixture having a pH below 7 and a temperature above a critical temperature;
    cooling the mixture to a temperature below the critical temperature thus causing the lignin to agglomerate into granular lignin solids as a precipitate in a residual liquid, said granular lignin solids having a moisture content of less than about 60%; and
    separating at least a portion of the residual liquid from the granular lignin solids to obtain dewatered granular lignin solids and clarified residual liquid.

2. The process of claim 1, wherein the temperature of the heated acidified dilution liquid is at a temperature above about 180° F.

3. The process of claim 1, wherein the temperature of the digestion liquor is between about 200° F. and 300° F.

4. The process of claim 1, wherein the step of cooling the mixture includes the step of placing the mixture in a tank.

5. The process of claim 4, wherein the granular lignin solids collect in the bottom of the tank, and the step of separating at least a portion of the residual liquid from the granular lignin solids includes removing granular lignin solids collected in the bottom of the tank from the tank.

6. The process of claim 1, wherein the critical temperature is from about 170° F. to about 200° F.

7. The process of claim 1, wherein the step of mixing the heated acidified dilution liquid and the spent digestion liquor to produce a mixture having a pH below 7 is the step of mixing the heated acidified dilution liquid and the spent digestion liquor to produce a mixture having a pH below 3.5.

* * * * *